United States Patent [19]
Müller, deceased et al.

[11] Patent Number: 5,249,623
[45] Date of Patent: Oct. 5, 1993

[54] RUBBER HEAT EXCHANGER

[76] Inventors: Fritz Müller, deceased, late of Berneustadt; by Jörg D. F. Müller, heir, Stentenbergstr. 31, 5275 Berneustadt, Fed. Rep. of Germany

[21] Appl. No.: 558,887

[22] Filed: Jul. 27, 1990

Related U.S. Application Data

[62] Division of Ser. No. 210,651, Jun. 23, 1988, Pat. No. 4,944,343.

[30] Foreign Application Priority Data

| Aug. 29, 1987 | [DE] | Fed. Rep. of Germany | 3728895 |
| Sep. 1, 1987 | [DE] | Fed. Rep. of Germany | 3729112 |
| Sep. 8, 1987 | [DE] | Fed. Rep. of Germany | 3730060 |
| Sep. 15, 1987 | [DE] | Fed. Rep. of Germany | 3730913 |
| Dec. 5, 1987 | [DE] | Fed. Rep. of Germany | 3741281 |

[51] Int. Cl.[5] .............................. F28D 7/10
[52] U.S. Cl. ..................... 165/156; 165/169; 165/905
[58] Field of Search ............ 165/46, 51, 156, 169, 165/905; 123/41.31, 557

[56] References Cited

U.S. PATENT DOCUMENTS

| 1,983,028 | 12/1934 | Henry | 165/163 |
| 2,756,027 | 7/1956 | Hutchings | 165/40 |
| 3,070,975 | 1/1963 | Cornelius | 165/51 |
| 3,105,708 | 10/1963 | Esty | 165/51 |
| 3,253,647 | 5/1966 | Deshaies | 123/557 |
| 3,557,868 | 1/1971 | Burkell | 165/163 |
| 3,779,308 | 12/1973 | Buhrmann et al. | 165/51 |
| 4,015,567 | 4/1977 | Zabenskie | 123/557 |
| 4,167,969 | 9/1979 | Ritzenthaler | 165/51 |
| 4,321,136 | 3/1982 | Matsui | 210/86 |
| 4,436,075 | 3/1984 | Campbell et al. | 123/557 |
| 4,562,890 | 1/1986 | Matoba | 237/12.3 R |
| 4,575,003 | 3/1986 | Linker et al. | 237/12.3 R |
| 4,676,895 | 6/1987 | Davis | 210/184 |
| 4,768,492 | 9/1988 | Widmer et al. | 123/541 |
| 4,862,951 | 9/1989 | Müller et al. | 165/51 |
| 4,944,343 | 7/1990 | Muller | 165/51 |

FOREIGN PATENT DOCUMENTS

| 960534 | 1/1975 | Canada | 123/557 |
| 1136938 | 12/1982 | Canada | 123/557 |
| 0069639 | 1/1983 | European Pat. Off. | |
| 496917 | 8/1927 | Fed. Rep. of Germany | |
| 2424941 | 1/1975 | Fed. Rep. of Germany | |
| 2745791 | 4/1979 | Fed. Rep. of Germany | |
| 2912241 | 10/1980 | Fed. Rep. of Germany | 165/40 |
| 993158 | 6/1949 | France | |
| 2534317 | 4/1984 | France | 123/557 |
| 2549148 | 1/1985 | France | |
| 0097041 | 6/1982 | Japan | |
| 59-108860 | 6/1984 | Japan | |
| 8005847 | 5/1982 | Netherlands | |
| 409436 | 12/1932 | United Kingdom | |

*Primary Examiner*—John K. Ford
*Attorney, Agent, or Firm*—Robert W. Becker & Associates

[57] ABSTRACT

A heat exchanger has warm coolant or liquid, for example from the engine, flow through it to heat it up. Disposed on the fuel filter is an electrical heating element that can directly heat the filter space or fuel contained in the filter housing. The heating element can be activated and deactivated in a controlled manner, for example manually, only when needed. The heat exchanger is formed of a rubber hose with a helically wound tube coil surrounding it with a sleeve being provided which surrounds the tube coil. The sleeve is made of rubber and securely connected to the hose by vulcanization.

3 Claims, 7 Drawing Sheets

RUBBER HEAT EXCHANGER

This is a divisional application based on co-pending allowed parent patent application of U.S. Ser. No. 210,651-Müller filed Jun. 23, 1988 now U.S. Pat. No. 4,944,343.

BACKGROUND OF THE INVENTION

The present invention relates to an apparatus for heating fuel, especially Diesel fuel and heating oil that is to be supplied to a motor, such as a Diesel engine of a vehicle or stationary unit, or to an oil-burning facility.

A commercially known apparatus for heating Diesel fuel comprises a continuous flow heater that is heated with the battery current of the vehicle and is installed in the fuel line ahead of the fuel filter. When the temperature is low, such a heater prevents precipitation of the paraffin in the fuel, and hence clogging of the fuel filter, by heating the fuel rather than undertaking an otherwise necessary addition of flowability improvers or the like to the Diesel fuel. Such a commercially known electrical Diesel-fuel heater is provided merely in order to heat the Diesel fuel, when frost exists and the temperatures of the Diesel fuel are below 0° C., to only such an extent that precipitation of paraffin can no longer occur in the fuel filter. Due to the enormous amounts of power that such commercial electrical Diesel-fuel heaters require, which represents an additional consumption of energy and places a tremendous load on the vehicle battery, these heretofore known electrical heaters are therefore activated, by a thermally responsive switch, as a function of the fuel temperature, only when the temperature has fallen below freezing; when the temperature is above freezing, the heater is automatically deactivated.

Aside from being faced with the precipitation of paraffin at temperatures below 0° C., Diesel fuel also presents the problem that with Diesel engines, in contrast to internal-reciprocating combustion engines, where the gasoline is to a large extent burned in vaporized form, the Diesel fuel is only atomized by the injection pump in very fine droplets; such fuel droplets are far more difficult to completely burn than is the gasoline air mixture of an internal combustion engine. Complete combustion of the Diesel fuel or oil is possible, if at all, only in the oxygen-rich, i.e. fuel-lean, edge zone of the fuel droplets; the more incomplete the atomization and more incomplete the combustion of the Diesel fuel are, the greater are, in addition to the discharge of nitrogen oxides, above all the generation of smokey and soot-containing exhaust gases and the emission of particulate matter in the Diesel exhaust. A significant improvement of the atomization, and hence a more complete combustion that uses less fuel and reduces the content of pollutants in the exhaust gases, could be achieved if the Diesel fuel were particularly flowable and even less viscous than its normal viscosity at ambient temperature; for this purpose, the Diesel fuel would have to be heated to temperatures in the range of between approximately 40° and 80° C. However, with the heretofore known commercially available electrical Diesel-fuel heaters, this is impossible to achieve because of the enormously high electrical energy that is required.

It is therefore an object of the present invention to provide an apparatus that can be manufactured in an extremely economical manner, that can be installed in a vehicle, even at a later stage, in a simple manner, and with which during cold winter temperatures the Diesel fuel can be heated if necessary in order essentially when the Diesel engine is started to prevent clogging of the Diesel filter due to highly viscous fuel, and at any time of the year, in an economical manner, the Diesel fuel can be continuously heated for operation of the Diesel engine to such an extent that as complete a combustion of the fuel as possible occurs in the Diesel engine, with such combustion additionally using less fuel and producing fewer pollutants.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The apparatus of the present invention is characterized primarily by a heat exchanger that is disposed upstream of a fuel filter in the fuel line and upstream or downstream of the motor or oil burner in the coolant line of the motor or in a liquid line in which flows a liquid that is heated up by the burner, with the coolant or liquid heating up the fuel in the fuel line, and by an electrical heating element that is disposed on the fuel filter for heating the inner space of the latter, with the heating element being adapted to be activated and deactivated in a controlled manner.

Further specific features of the present invention will be described in detail subsequently.

Description of Preferred Embodiments

Figure 1:
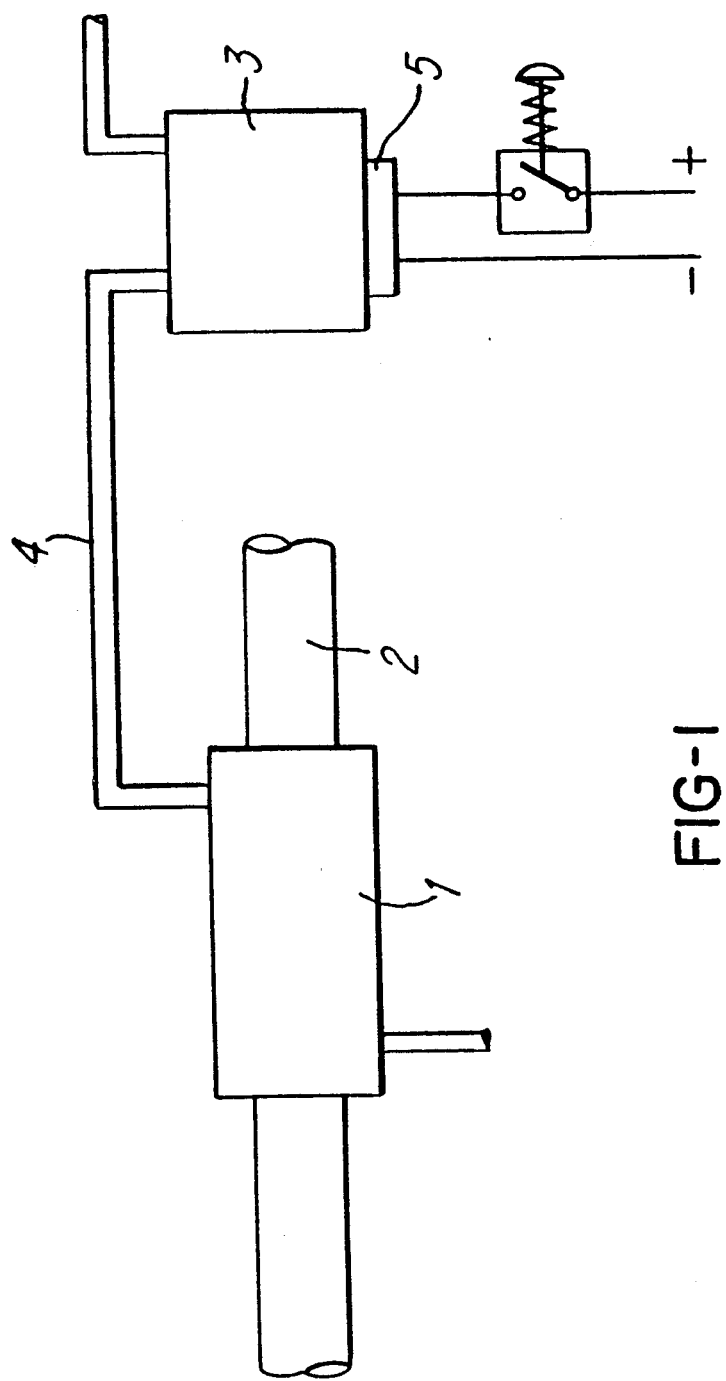
FIG. 1 is a view that diagrammatically illustrates the heat exchanger and the electrical heating element as the main components of the inventive apparatus.

Referring now to the drawings in detail, the schematically illustrated apparatus of FIG. 1 includes a heat exchanger 1 that is placed in a coolant line 2 of the vehicle, such as a cooling water line, between the engine and the radiator, either upstream or downstream of the engine. In the heat exchanger 1, the fuel line 4, which is conveyed through the heat exchanger and on to the Diesel-fuel filter 3, is in a heat exchange relationship with the engine coolant. Instead of using engine coolant, the heat exchanger could also be heated with engine exhaust or with cooling air for the engine. The apparatus also includes an electrical heating element 5 that is preferably disposed directly on the Diesel-fuel filter 3, and that heats the inner space of the filter. The heating element 5 can be activated and deactivated in a controlled manner, for example manually if needed, or automatically with the aid of a temperature sensor, when the temperature of the fuel has fallen below a predetermined temperature at the inlet or in the interior of the Diesel-fuel filter 3. By way of example only, since the specific means via which the heating element 5 is activated or deactivated is not critical to the inventive concept, a manually operated switch, such as a push button, has been illustrated in FIG. 1. Shortly after the engine has been started, and as soon as coolant that becomes warm reaches the heat exchanger, the Diesel fuel is heated in the heat exchanger to a temperature that in winter is greater than the limit of the filterability, and prevents clogging of the Diesel-fuel filter. Furthermore, the Diesel fuel is continuously warmed up, without additional expenditure of energy for a given driving operation, and the ability of the fuel to flow is improved, both in such a way that a more complete combustion with less soot, and a reduction of the fuel consumption, occur. A further advantage of heating the fuel in the fuel filter 3 with the heating element 5 is that the engine will be easier to start. To bridge the starting phase until the heat exchanger has achieved sufficient efficiency, if the temperature is particularly cold, a Diesel-fuel filter 3 that might be frozen-up can be thawed by activating the electrical heating element 5, whereby the filter 3 is heated up to such an extent that a thickening of the fuel that flows through the filter and has not yet been heated up in the heat exchanger 1 does not occur. If it becomes necessary to thaw the filter and/or to heat up the contents of the filter, the electrical heating element 5 need be activated for only a short period of time. To save power and to conserve the battery of the vehicle, activation and deactivation of the heating element 5 can be effected in a very simple manner, for example manually via the push-button arrangement that has been illustrated as just one of many possible ways of activating or deactivating the heating element 5.

Figure 2:
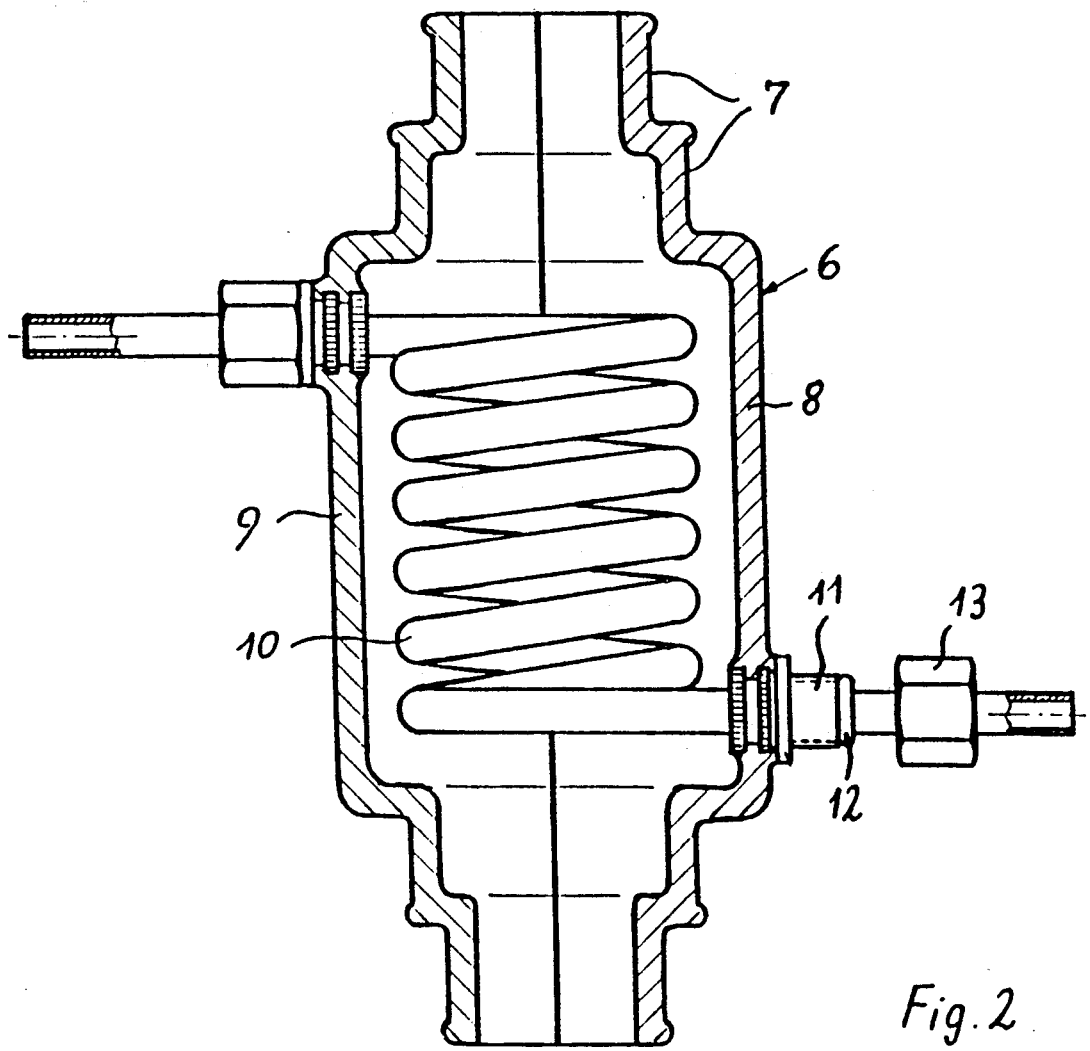
FIG. 2 is a partial cross-sectional view of a first exemplary embodiment of the inventive heat exchanger.

The heat exchanger illustrated in FIG. 2 comprises a cylindrical housing 6, both ends of which are provided with a stepped connector 7 on which can be placed and clamped a coolant hose; the stepped configuration allows adaptation to the differently diametered hoses that are encountered. In the longitudinal direction, the housing 6 is divided into two semi-cylindrical shells 8 and 9 that are tightly connected to one another, for example by being bolted together at connecting flanges that extend from the longitudinal edges of the shells. Disposed between the two shells 8 and 9 is a tube coil 10 that is helically coiled in the longitudinal direction of the housing, and that can be connected to the fuel line 4. The ends of the tube coil 10 extend in the radial direction through pass-through sleeves 11 that are sealingly and securely disposed on the shells. These ends of the tube coil 10 are sealingly disposed in the pass-through sleeves via a sealing ring 12, for example an O-ring, and the housing 6, for example, can be made of aluminum or sheet metal. Assembly of this heat exchanger is quite simple, because the tube coil 10 can be very easily placed between the two shells 8 and 9, and the ends of the tube coil can be guided out of the housing and can then easily and satisfactorily be sealingly secured in the pass-through sleeves of the housing.

Figure 3:
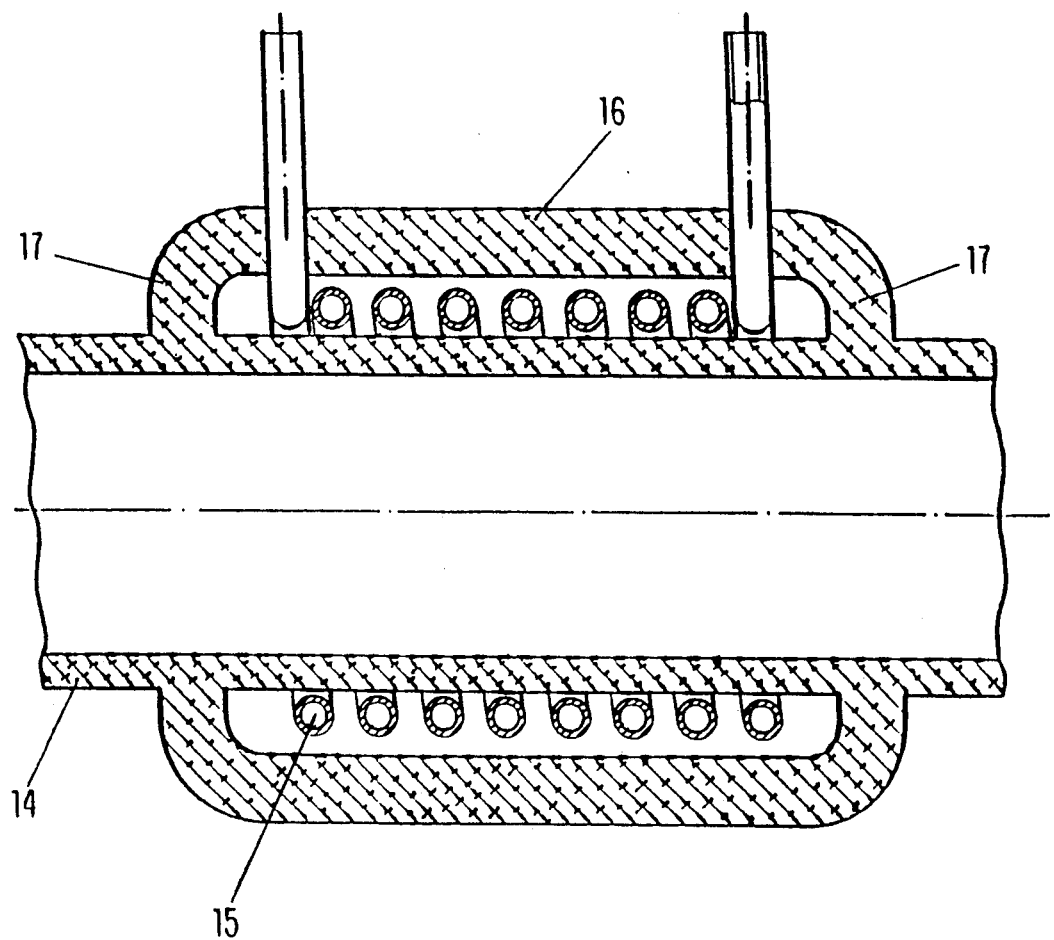
FIG. 3 is a partial cross-sectional view of a second exemplary embodiment of the inventive heat exchanger.
Figure 3A:
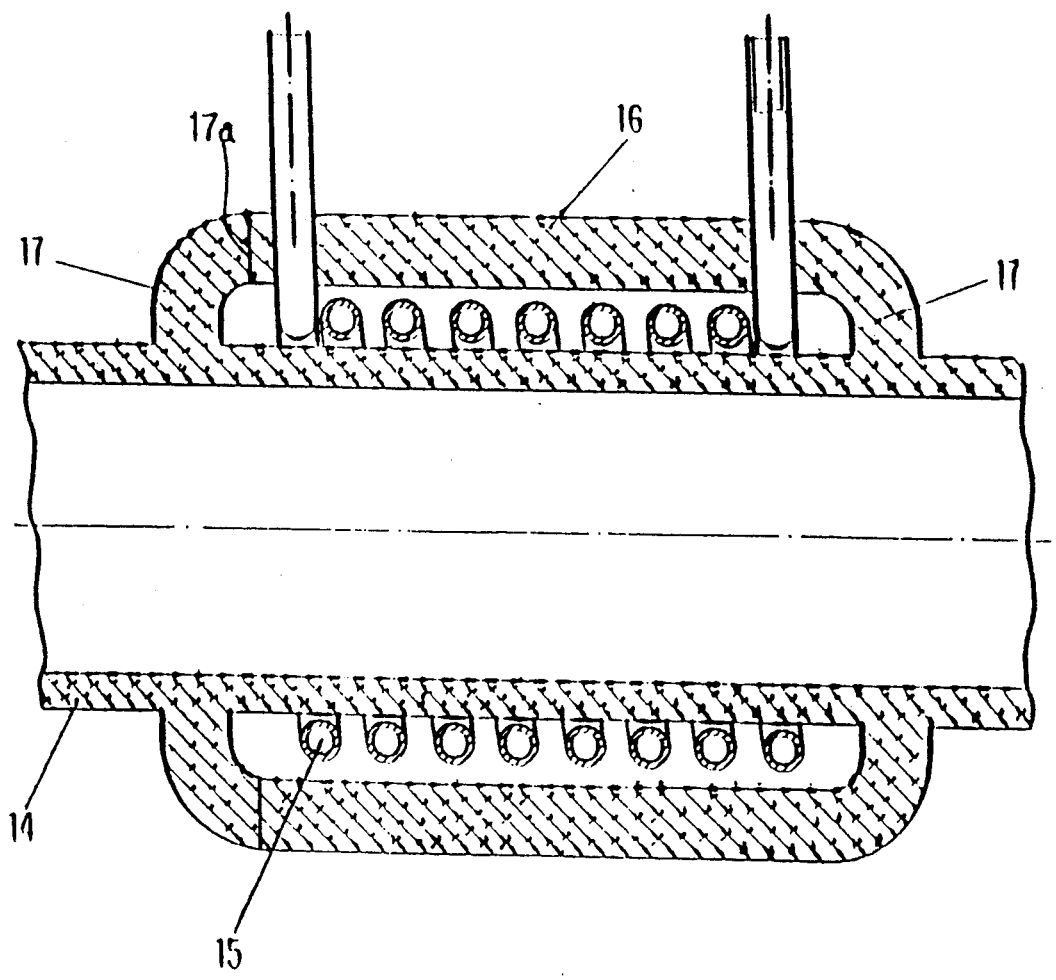
FIG. 3a is a modification of FIG. 3 showing a detachable endwall.

The heat exchanger illustrated in FIG. 3 comprises a rubber hose 14, such as is customarily used as a coolant hose between the engine and the radiator; it should be noted that although the hose 14 is designated as a rubber hose in the illustrated embodiment, this hose could, of course, also be made of any other material that is customarily used to produce flexible hoses, including other elastomeric materials or plastic. The heat exchanger further comprises a helical tube coil 15 that is placed over the rubber hose 14 and that in turn is surrounded by a sleeve 16 to prevent unnecessary heat loss. The space between the rubber hose 14 and the sleeve 16 is closed off at the ends by end walls 17. The sleeve 16 and the end walls 17 can be a single piece, and can be made of rubber that is securely connected to the rubber hose 14 by vulcanization. The sleeve 16 could also be made of some other elastomeric material or plastic, and could be placed upon the rubber hose 14, whereby at least one of the end walls 17 could be detachably connected, as denoted at 17a in FIG. 3a, sleeve 16 in order to be able to place the latter over the helical tube coil 15, which would already have been placed upon the rubber hose 14. The space between the rubber hose 14 and the sleeve 16 can also be filled with a solid material that has a good heat conductivity. The tube coil 15 could be embedded in such a filler material prior to being placed upon the rubber hose 14. The heat exchanger configuration illustrated in FIG. 3 has the significant advantage that the manufacture of the heat exchanger can be integrated directly into the manufacture of the customary coolant hoses for motor vehicles, and the cooling water or coolant line that contains the heat exchanger comprises a continuous uninterrupted hose section that needs to be connected to only the engine and the radiator. By means of, for example, the thickness of the rubber hose in the region of the tube coil, the number of windings of the tube coil, the type of filling in the space between the hose and the sleeve, etc., heat transfer from the coolant to the Diesel fuel can be influenced in such a way that at normal coolant operating temperatures, the Diesel fuel has a temperature that is expedient for injection and atomization, i.e. approximately 70° C., and the fuel is not heated to a temperature that leads, for example, to vapor lock.

With the heat exchanger configuration illustrated in FIG. 2, it would be possible, for example, to dispose two heat exchangers one after the other in the same coolant hose in order to be able to undertake the continuous heating of the Diesel fuel with one of the heat exchangers, and to produce warm wash water for the windshield washer with the other heat exchanger. With the embodiment illustrated in FIG. 3 and 3a, to heat Diesel fuel and water for the windshield washer, respective cooling water hoses each having a tube coil are provided in both the cooling water feed circuit and the cooling water return of the engine; alternatively, a second tube coil 15 can be placed upon the hose 14 and can be surrounded with the same or a further sleeve 16.

Figure 4:
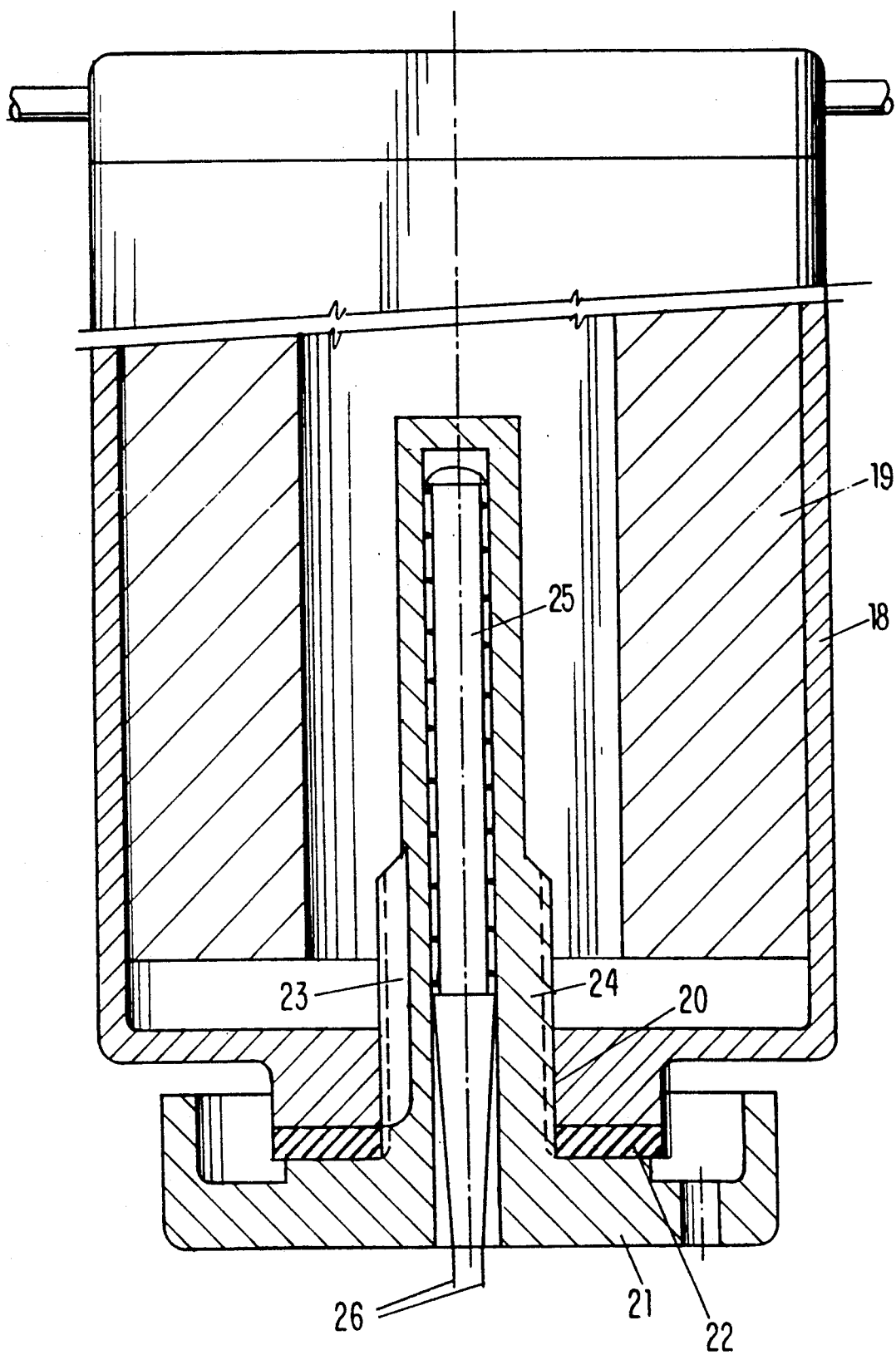
FIG. 4 is a view that shows one exemplary embodiment of the inventive electrical heating element.

FIG. 4 shows a particularly simple and advantageous configuration of the electrical device of the inventive apparatus for heating the Diesel fuel. This electrical heating device or element is separate from the heat exchanger both for manufacturing as well as assembly reasons. In this embodiment, the casing of the Diesel-fuel filter itself is also used as a heat exchange chamber for receiving an electrical heating element about which the Diesel fuel flows. The casing 18 of the Diesel-fuel filter contains a filter element 19, the middle of which is provided with a hollow space in the customary manner. As is also customary, below this hollow space the filter casing is provided with a water drain opening 20 that is closed off by a drain plug 21. By loosening the latter, a gasket 22 is lifted somewhat from the filter housing or from the drain plug, and separated-off water can be drained from the Diesel-fuel filter through a longitudinal groove 23 that is formed on the threaded end 24 of the drain plug 21. The electrical heating element, which is in the form of a heating rod 25 that projects into the hollow space of the filter element 19, is disposed on he threaded end 24. The leads of the heating rod 25 are guided through the threaded end 24 of the drain plug 21 and end in connection contacts 26 on the outer surface of the drain plug. If the latter is made of metal, it is necessary to insulate only the power supply line to the heating rod as it is guided through the drain plug, while the return line can be achieved directly via the drain plug to the customarily metallic filter housing as a ground pole. The heating rod 25 expediently comprises a heater filament coil that is wound on a ceramic core; the heater filament is made, for example, of niccolite having a diameter of up to 1 mm. The particular advantage of this embodiment of the electrical heating element for heating the Diesel fuel is that in addition to arranging the heat exchanger in the coolant water circuit, any commercially available Diesel-fuel filter can, in a very simple manner, be converted to an electrical Diesel-fuel heater by replacing the conventional drain plug with a drain plug that is equipped with an electrical heating rod as taught by the present invention. No additional conversion and sealing operations are necessary for the Diesel fuel line.

The electrical heating element in the form of the heating rod 25 can also, in the manner of an immersion heater, be guided into the filter housing from above through an opening that is provided in the filter covering.

Figure 5:
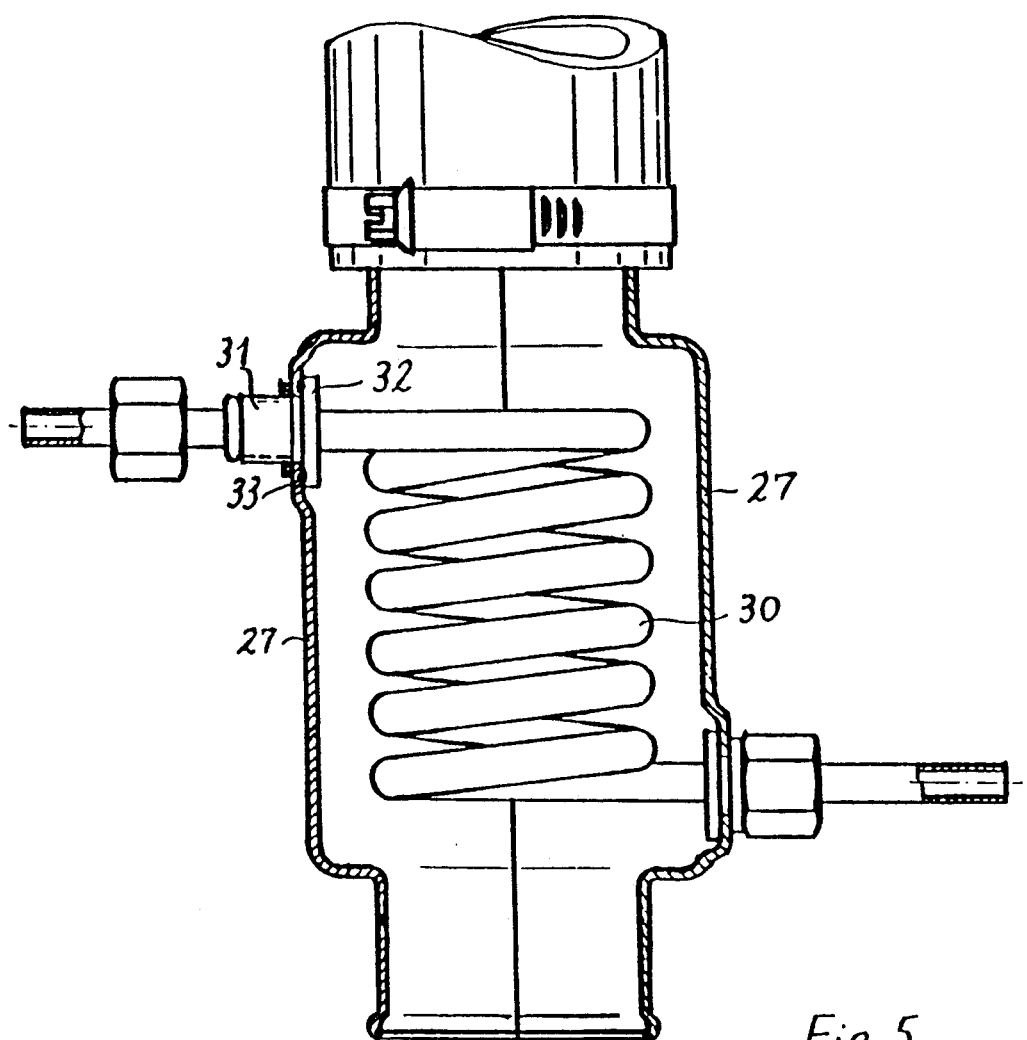
FIGS. 5 and 6 are partial cross-sectional views of a third exemplary embodiment of the inventive heat exchanger.
Figure 6:
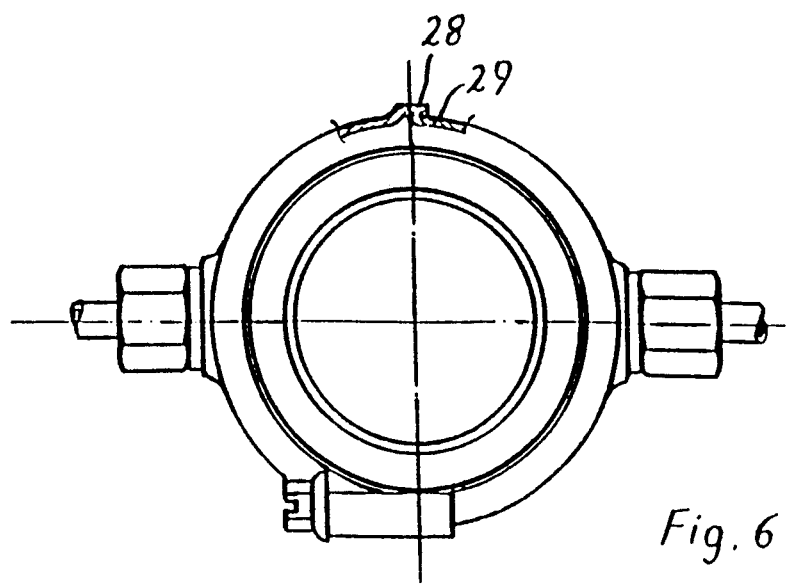

In the embodiment of the heat exchanger illustrated in FIGS. 5 and 6, which is similar to the heat exchanger of FIG. 2, the two semi-cylindrical shells 27 are made of sheet metal. The longitudinal edges 28 of one of the housing shells 27 are offset in the radial direction, preferably in an outward radial direction, and overlap the longitudinal edges 29 of the other housing shell 27. Where the longitudinal edges 28 and 29 overlap, the two housing shells 27 are tightly and securely interconnected, for example via induction welds, after the tube coil 30 has been easily installed in the manner described previously. The pass-through sleeves 31, through which the ends of the tube coil 30 are guided and in which these tube coil ends are sealingly disposed, for example via a crimp ring coupling, are provided with a flange-like securing shoulder 32 and are inserted, preferably from the inside of the housing, through holes in the sheet-metal wall of the housing shells 27. The pass-through sleeves 31 can be secured by a lock nut that is screwed on from the outside. The sealed securement of the pass-through sleeves 31 to the sheet-metal walls of the housing shells can advantageously be effected in a mechanical manner via induction welds that can be effected at the same time that the two housing shells are interconnected via induction welds. To effect induction welding of the pass-through sleeves 31 to the sheet-metal walls of the housing shells 27, the securing shoulders 32 are expediently provided with a bead 33 that extends around the pass-through sleeve 31 in an annular manner, and via which the securing shoulders 32 contact the sheet-metal walls and assure that the induction welds will provide a tight seal.

Figure 8:
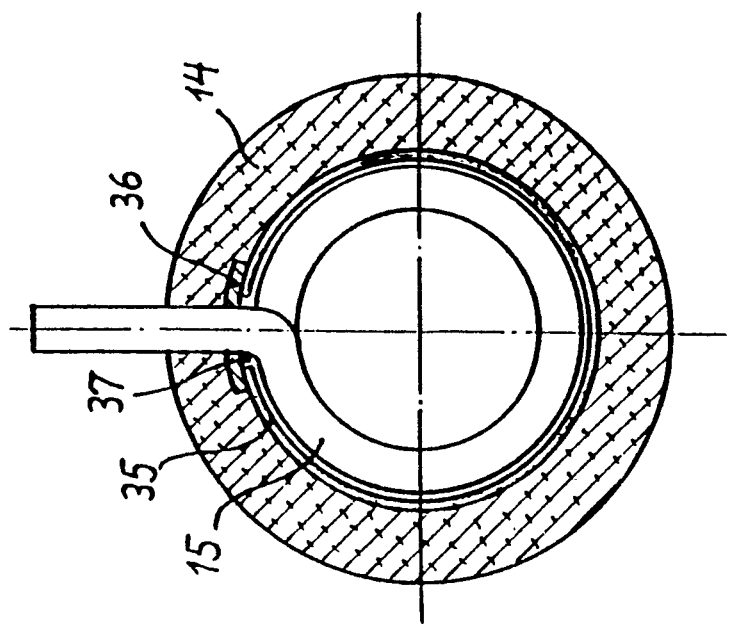
FIGS. 7 and 8 are partial cross-sectional views of a fourth exemplary embodiment of the inventive heat exchanger.
Figure 7:
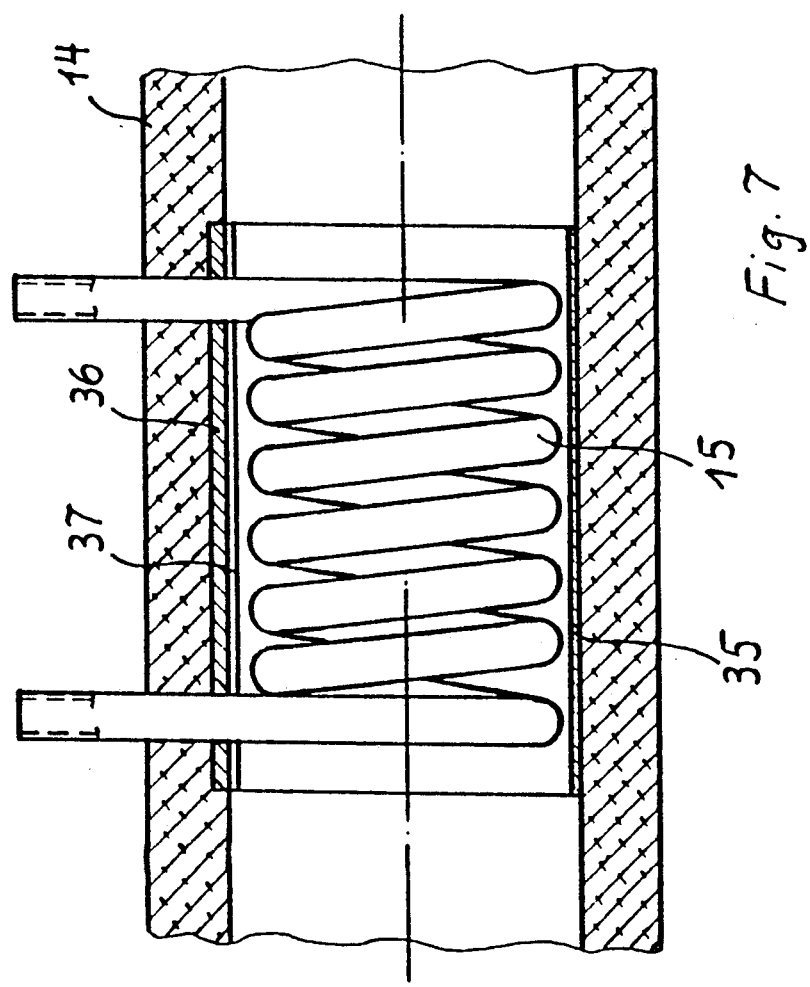

The heat exchanger illustrated in FIGS. 7 and 8, just like the heat exchanger illustrated in FIG. 3, comprises a hose 14 of rubber, plastic, or some other elastomeric material, and a tube coil 15. However, with the inventive embodiment of FIGS. 7 and 8, the tube coil 15 is freely disposed, i.e. is exposed, in the interior of the hose 14, so that the fluid or liquid, such as engine coolant water, that flows through the hose flows directly around the tube coil 15. The radially directed ends of the tube coil 15 pass in a liquid tight manner through the wall of the hose 14 and are guided beyond this hose. The tube coil 15 is disposed in the hose during the vulcanization production if the hose is made of rubber, or during the injection molding process if the hose is made of plastic or some other synthetic material. For this purpose, the tube coil 15 is placed in the molding apparatus that is used for producing the hose. So that during this process the hose material does not leak into or otherwise enter the tube coil 15 or embed this tube coil, the tube coil 15 is already during the hose production surrounded by a sleeve 35 that can be made of any desired material that can withstand the temperature at which the hose material is processed. In order to be able to insert the two radially projecting tube ends of the tube coil 15 into the sleeve 35, a longitudinal slot 37 is provided somewhere along the periphery of the sleeve 35; the ends of the tube coil 15 can be inserted through the longitudinal slot 37 in the longitudinal direction of the sleeve 35. In order to seal the longitudinal slot 37, a strip-like cover member 36 is placed upon the outer surface of the sleeve 35. To accommodate the two radial ends of the tube coil 15, the cover member 36 is provided with two holes. As a result, the cover member 36 can be inserted in a radial direction over the two ends of the tube coil 15 and upon the outer surface of the sleeve 35.

It should be noted that the use of the inventive heat exchanger configuration illustrated in FIGS. 2, 3, 5, and 7 for heating the Diesel fuel does not necessitate that in addition the electrical heating element at the Diesel-fuel filter also has to be used for heating the inner space of the filter. Even without utilizing the electrical element for heating the Diesel fuel, the heat exchanger embodiments described in conjunction with FIGS. 2, 3, 5, and 7 can be very advantageously used to continuously heat the Diesel fuel to such an extent beyond the temperature needed to prevent clogging of the filter, regardless of the time of year, that an improvement of the atomization during injection, and a fuel-saving combustion in the engine with few pollutants, occur.

It should be understood that the inventive apparatus taken as a whole, or even only the inventive heat exchanger of FIGS. 2, 3, 5, and 7, can, when viewed in general as a device for economizing on Diesel fuel, be used not only for all vehicles that have Diesel engines, including locomotives and ships, but also for stationary units where Diesel fuel or heating oil is atomized for combustion, for example even oil-burning furnaces or similar heating facilities in buildings, in order to use the warm water that circulates through the heating facility to heat the heating oil to improve the atomization and combustion in the oil burner.

The present invention is, of course, in no way restricted to the specific disclosure of the specification and drawings, but also encompasses any modifications within the scope of the appended claims.

What I claim is:

1. In an apparatus for heating a first liquid that is to be supplied via a first line, with a second line being provided in which flows a second heated liquid, the improvement wherein said apparatus is in the form of a heat exchanger, with said second line being in the form of a hose made of rubber, said hose having an outer surface about which said first line is disposed in the form of a helically wound tube coil, and with a sleeve being provided that surrounds said tube coil, said sleeve being spaced from said outer surface of said hose to form an annular space therebetween, and having radially inwardly extending end walls at both ends for closing off said annular space in an axial direction of said sleeve, with said annular space extending continuously between said end walls, said end walls being connected with said hose, said tube coil being arranged in said annular space, wherein said sleeve of the heat exchanger and said hose consist of rubber, with said end walls being securely connected with said hose of rubber by vulcanization.

2. An apparatus according to claim 1, wherein portions of said annular space that are not occupied by said tube coil are filled with a good heat-conducting rigid material.

3. An apparatus according to claim 1, in which said tube coil has radially outwardly directed ends that pass through said sleeve in a sealing manner.

* * * * *